June 8, 1965    W. A. MASON, JR    3,188,054
TUBULAR VIBRATOR
Filed July 12, 1963
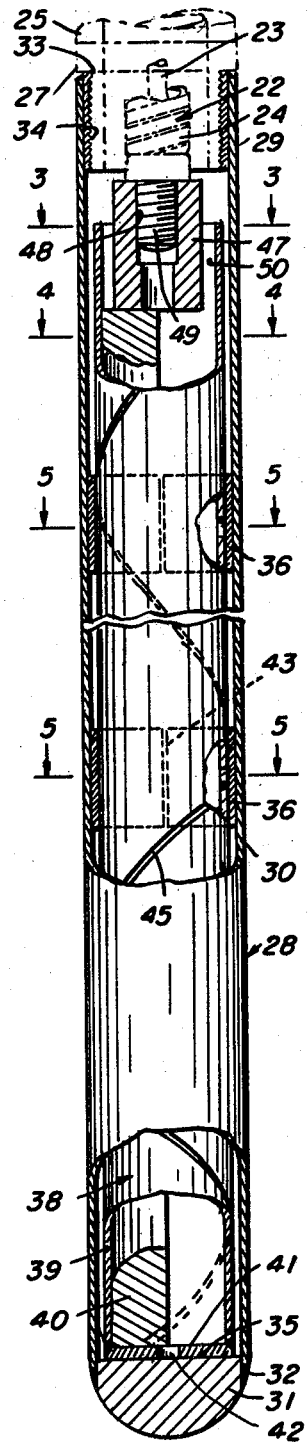
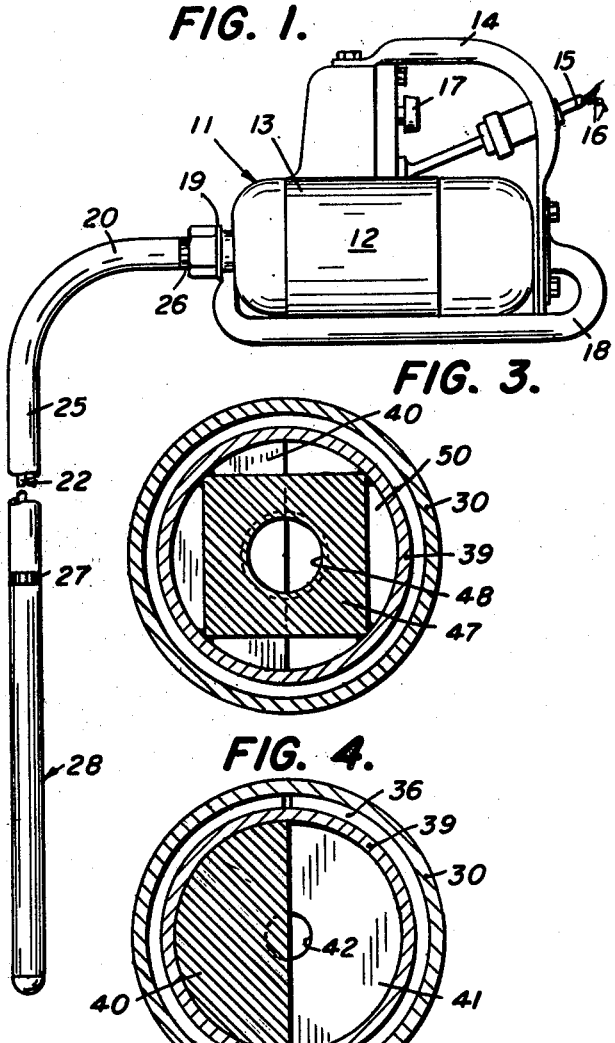
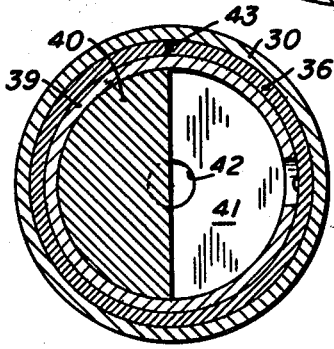
INVENTOR
WYLIE A. MASON, JR.
BY
ATTORNEY

3,188,054
TUBULAR VIBRATOR

Wylie A. Mason, Jr., Thousand Oaks, Calif., assignor to Viber Company, Burbank, Calif., a corporation of California
Filed July 12, 1963, Ser. No. 294,654
7 Claims. (Cl. 259—1)

This invention relates to a tubular vibrator for compacting unset concrete and in particular to a vibrator structure in which the elongated eccentrically internally weighted rotary mechanism is mounted in sleeve bearings intermediate the ends of the weight, and re-circulating lubrication is provided.

High speed rotating externally eccentrically weighted vibratory mechanisms in which the rotor is mounted on bearings at the ends of the rotor, enclosed in rigid tubular housings, are now commonly used for the internal compaction of unset concrete in mass placements and in forms.

It is a principal object of this invention to provide an improved mechanism for an insertible eccentric weight vibrator particularly for compacting concrete having means for continuously circulating the lubricant to sleeve bearings which mount an eccentric internally weighted sleeve rotor within a cylindrical housing. A further object is to provide a simple vibratory mechanism for high speed rotation in which the heat generated at the bearings is dissipated by continuously circulating lubrication. Another object is to provide in a flexible drive shaft tubular vibrator, a means for continuous circulation of lubricant to the flexible shaft as well as to the bearings for the rotor. Still another object is to provide a reservoir for lubricant within a hollow cylindrical internally eccentricaly weighted rotor. A further object is to provide in a vibratory means pumping means disposed on the exterior surface of the cylindrical eccentrically weighted rotor.

These and other objects are attained by my invention, which is described in the following description of a preferred form thereof, reference being made to the accompanying drawings in which:

FIG. 1 is a side elevational view, partly in section, showing one form of my vibrator having a flexible drive means between the motor and the vibratory head;

FIG. 2 is an enlarged elevational view of the vibrator head with parts broken away and the interior structure shown in section and elevation;

FIG. 3 is a cross-sectional view taken on the line 3—3 of FIG. 2;

FIG. 4 is a cross-sectional view taken on the line 4—4 of FIG. 2; and

FIG. 5 is a cross-sectional view taken on the line 5—5 of FIG. 2.

Referring to the drawings, one form of my vibrator consists in general of a rotary means, a vibrator head, and a flexible drive means operatively arranged between them. The motor means 11 consists of a high speed electric motor 12 in a motor housing 13 with handle means 14, flexible electric conduit means 15 with power leads 16, and switch control 17. A skid frame 18 is shown attached to the housing 13, and removable fitting means 19 for attachment of the flexible shaft casing 20 to the motor housing 13 are also provided.

The flexible drive means 22 consists of a flexible shaft or core 23 which is encased in a flexible conduit 24 which in turn is covered with a reinforced rubber hose 25 and is provided with end fittings 26 and 27 which are adapted to make threaded connection with corresponding threaded parts respectively on the motor housing 13 and the vibrator head housing 29.

The vibrator head 28 consists of a metal tubular housing 30 which is provided with a closure 31 at one end, the closure having a thrust bearing surface 35, this closure being preferably attached to the tubular housing 30 by welding as at 32. The end 33 of the tube opposite the closure 31 is provided with internal threads 34 which removably engage the threaded fitting 27 of the flexible shaft casing 20. The tubular housing 30 is provided internally with sleeve bearings 36 which are press fitted and adapted to support the eccentrically internally weighted rotor 38.

The internally eccentrically weighted rotor 38 consists of a cylindrical tube 39 having a weight member 40 affixed to the inside wall of said tube 39 and extending for substantially its full length. As shown the weight 40 is half cylindrical in shape but it may be more or less than a half cylinder when a different degree of eccentricity is desired. The cylindrical tube 39 is provided with a closure disk 41 which is attached, as by welding, to the end of the rotor in a position abutting the end closure 31. The closure disk 41 of the tube 39 is provided with a central opening 42 which provides for the circulation of lubricant between the surfaces of the end closure 31 and the closure disk 41.

The sleeve bearings 36, of which two are shown, are provided with longitudinal oil grooves 43 which permit the longitudinal circulation of liquid lubricant in the space between the housing 30 and the rotor tube 39. The outer surface of the tube 39 is provided with a helical groove 45 of steep pitch which extends the full length of the tube and functions to pump the liquid lubricating oil from the lower end of the vibrator to the upper end, as will be further described.

The upper end of the cylindrical tube 39 is provided with a connector block 47 with oil openings therethrough, which is pressed into the tube 39 and fastened in place. As shown the block 47 is square in cross-section and of such size that the corners engage the inner wall of the tube 39, and it is attached as by welding at the corners, leaving the segmental openings 50 for oil circulation. The connector block 47 is provided with an axially threaded hole 48 which is adapted to be engaged by the threaded attachment 49 on the core 23 of the flexible drive means 22.

The space between the tubular housing 30 and the cylindrical tube 39 as well as the space inside the cylindrical tube 39 which is not occupied by the weight 40 is filled with lubricating oil which may also extend around the core 23 inside the rubber hose member 26, thus lubricating all of the moving parts of the flexible drive and the vibrator head. The force of gravity causes the oil to flow downwardly inside the tube 39 and the helical groove 45 on the exterior surface of the tube 39, which it is in rotation, pumps the oil upwardly, thus continuously circulating the lubricant. This results in cooling the sleeve bearings 36 as well as the core 23 of the flexible drive means.

The internally eccentrically weighted rotor 38 is supported by and rotates in the sleeve bearings 36 which are disposed intermediate the ends thereof and thus the vibrational energy is transmitted directly to the walls of the housing 30. This arrangement reduces the damping and spring effect experienced in conventional vibrators whose eccentric rotors are supported between bearings.

The advantages of my structure are additionally that not only is there a decrease in the frictional resistance of the moving parts resulting in a reduced amount of power required for operation, but also the non-rotating structure is lighter in weight, simple, and inexpensive to manufacture because this structure eliminates the expensive ball bearings and roller bearings which have heretofore been employed and substitutes therefor the sleeve bearings which, with the circulating lubricant and avoidance of frictional heat, give long service-free life to the vibrator.

The objectives set forth in the beginning have been attained by my invention.

I claim:

1. An insertible vibrator for compacting unset concrete comprising a motor means, a vibrator head, and a flexible drive means including a flexible core and a flexible casing therefor, operatively disposed between said motor means and said vibrator head; said vibrator head comprising an elongated housing having a cylindrical bore and having means at one end for attachment to said flexible drive shaft casing, and having closure means at the other end; an elongated cylindrical rotor within said housing concentric with and spaced apart from the said cylindrical bore of said housing, said rotor being internally eccentrically weighted; means to operatively connect said flexible drive means to said rotor for rotating it within said housing; a plurality of sleeve bearings for said rotor spaced longitudinally along said housing; and lubricating means associated with the surface of said rotor for circulating oil under pressure to said sleeve bearings.

2. The vibrator defined in claim 1, in which said lubricating means includes a groove on the surface of said rotor for continuously replenishing lubricating oil between the contacing bearing surfaces of said sleeve bearings and the juxtaposed surfaces of said rotor.

3. An insertible vibrator for compacting unset concrete comprising a motor means, a vibrator head, and a flexible shaft enclosed within a flexible casing operatively connected between said motor means and said vibrator head; said vibrator head comprising an elongated housing having a cylindrical bore and having means at one end for attachment to said flexible drive shaft casing, and having closure means at the other end; an elongated cylindrical rotor within said housing concentric with and spaced apart from the said cylindrical bore of said housing, said rotor being internally eccentrically weighed; means to operatively connect said flexible shaft to said rotor for rotating it within said housing; a plurality of sleeve bearings for said rotor spaced longitudinally along said housing; an end thrust bearing for said rotor on said closure means in said housing; helical groove means on the exterior surface of said rotor and passing over the surfaces of said sleeve bearings for circulating lubricating oil to and from said sleeve bearings; and means including an opening in the lower end of said rotor for providing lubricaing oil to said end thrust bearing.

4. A vibrator head for a vibratory tool for compacting unset concrete comprising an elongated housing having a cylindrical bore and having means at one end for attachment to a drive shaft casing, and having closure means at the other end; an elongated cylindrical rotor within said housing concentric with and spaced apart from said cylindrical bore of said housing, said rotor being internally eccentrically weighted; means to operatively connect said rotor to a drive shaft for rotating it within said housing, a plurality of sleeve bearings for said rotor spaced longitudinally along said housing; and lubricating means associated with said rotor for circulating oil under pressure to said sleeve bearings.

5. The vibrator head defined in claim 4, in which said lubricating means includes a groove on the surface of said rotor for continuously replenishing lubricating oil between the contacting bearing surfaces of said sleeve bearings and the juxtaposed surfaces of said rotor.

6. The vibrator head defined in claim 4, and an end thrust bearing for said rotor on said closure means in said housing; helical groove means on the exterior surface of said rotor for circulating lubricating oil to and from said sleeve; and means including an opening in the lower end of said rotor for providing lubricating oil to said end thrust bearing.

7. In an insertible vibrator head for compacting unset concrete having an elongated housing with a cylindrical bore and a closure means therefor at one end, and a cylindrical eccentrically weighted rotor rotatable within said housing and concentric with and spaced apart from said cylindrical bore; a plurality of sleeve bearing means for said rotor spaced longitudinally along said housing, an end thrust bearing for said rotor on said closure means in said housing; helical groove means on the exterior surface of said rotor for circulating lubricating oil to and from said sleeve bearings; and means including an opening in the lower end of said rotor providing lubricating oil to said end thrust bearing.

References Cited by the Examiner

UNITED STATES PATENTS

| Re. 23,976 | 4/55 | Kistler | 308—124 X |
|---|---|---|---|
| 2,259,113 | 10/41 | Mall | 259—1 |
| 2,479,799 | 8/49 | Wilde | 259—1 |
| 2,597,505 | 5/52 | Lindkvist | 259—1 |
| 2,648,247 | 8/53 | Schmuziger | 308—237 |
| 2,678,195 | 5/54 | Hunter et al. | 259—1 |

FOREIGN PATENTS

| 24,495 | 11/08 | Great Britain. |
|---|---|---|
| 453,402 | 11/49 | Italy. |

CHARLES A. WILLMUTH, *Primary Examiner.*